Nov. 4, 1958 W. REICHE 2,858,753
TWIN-LENS PHOTOGRAPHIC REFLEX CAMERA
Filed Sept. 1, 1955
FIG.1
FIG.2
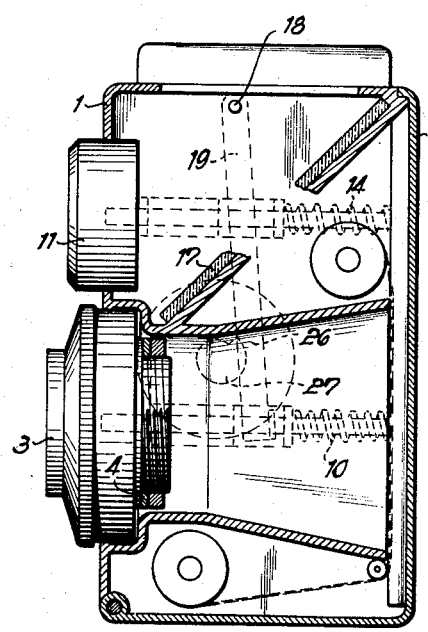
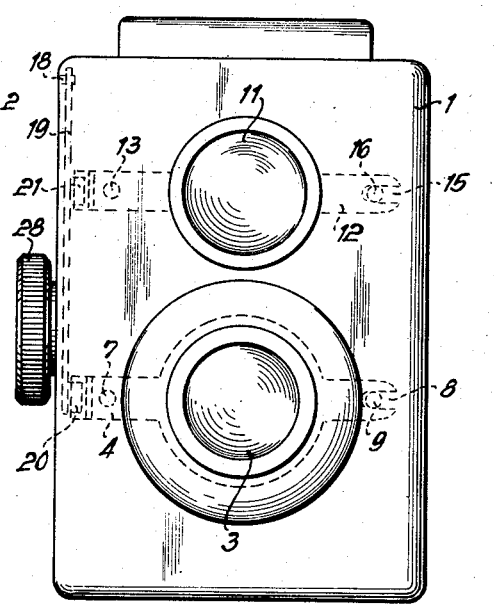
FIG.3
FIG.4
INVENTOR
WILLI REICHE
BY
ATTORNEYS

United States Patent Office 2,858,753
Patented Nov. 4, 1958

2,858,753

TWIN-LENS PHOTOGRAPHIC REFLEX CAMERA

Willi Reiche, Braunschweig-Gliesmarode, Germany, assignor to Voigtländer-Aktiengesellschaft, Braunschweig, Germany, a corporation of Germany Application September 1, 1955, Serial No. 531,974

Claims priority, application Germany September 8, 1954

1 Claim. (Cl. 95—44)

This invention relates to twin-lens reflex cameras and it has particular relation to cameras of this type, in which the taking objective and the viewing objective have different focal lengths.

In the photographic cameras having two objectives, one of which serves for picture taking and the other for viewing and sharp focusing, for example in reflex cameras, construction of the mechanism for the objective displacement causes, in general, no difficulties as long as the objectives have equal focal lengths, because in such a case the necessary displacements of the two objectives are also equal. The objectives can be mounted on a common objective carrier, which is caused by a suitable mechanism to move in the direction of the optical axis.

Difficulties in the construction of the device for causing displacement of the two objectives are encountered mostly if the focal length of the viewing objective differs from that of the taking objective.

In a known construction of this type, in which the two objectives are coupled by means of a toothed wheel gearing, the two objectives are displaced by a multiplex thread of high pitch, whereby a separate multiplex thread, the pitch of which corresponds to the respective focal length, is provided for each of the objectives. The manufacture of this construction is expensive, because the multiplex threads, as well as the gearing must meet high precision requirements.

In another known construction instead of the total objective only the front lens is displaced, whereby the mounts of the two front lenses are coupled likewise by a toothed wheel gearing. The advantage of this construction is that, in most cases, the use of a multiplex thread can be dispensed with, because, as a rule, the focal length of the front lens is so small that the displacements of the lens are small. But thereby the generally known peculiarities of the front lens adjustment must be accepted.

In a specific case the focal lengths of the two front lenses may be equal although the total focal lengths of the objectives are different, so that the pitches for both front lenses are equal and the transmission ratio of the toothed gearing is 1:1.

In this last mentioned construction, as well as in the above described system with displacement of the total objective, the axial distance of the two objectives by the necessary toothed gear coupling, must be kept very exactly, because the gearing must be free from lost motion. Furthermore, the toothed wheels should not show even the slightest knocking.

The device according to the present invention for reflex cameras having objectives of different focal lengths, is based on different and novel principles, in the use of which the disadvantages of the above described prior art devices do not occur. According to this invention, both objectives are connected with a unilaterally pivoted rocking lever in such a manner that in the rocking movement for effecting sharp focusing each of the objectives is displaced by an amount which corresponds to the individual focal length of the respective objective.

In carrying out the present invention, the objectives are provided with cylindrical, or similar, guide means. The rocking lever is controlled by a cam which is adjustable by an adjusting knob from the outside of the camera. The viewing objective and the taking objective are each preferably arranged on slides which glide on guide rails, are under spring effect, and are permanently coupled over angle pieces with angle parts of the rocking lever. The position of the objective slide relative to the rocking lever, can be adjusted by means of adjusting screws arranged in the angle pieces. Another possibility of adjustment results by the mutual contact points between slides and rocking lever being adjustable to different lever lengths on the rocking lever. This is rendered possible by a suitable design of the angle pieces forming the respective connections.

In carrying out this invention, the use of highly sensitive toothed wheels and multiplex threads is unnecessary.

The appended drawings illustrate by way of example an embodiment of the invention, to which the invention is not limited. In these drawings, Figure 1 illustrates a twin-lens reflex camera in longitudinal section viewed from the side;

Figure 2 is a view of the front side of the camera;

Figure 3 is a sectional view of the camera at the height of the picture-taking objective in top view, and Figure 4 illustrates an individual member of the adjusting device.

Referring now to the drawings in detail, in Fig. 1 reference symbol 1 denotes the casing of a twin-lens reflex camera, to which a tiltable back wall 2 is hinged. The picture-taking objective 3 which is built-in in a shutter, is fastened to a slide 4 (see Fig. 3), the eyelets 5 and 6 of which glide on guide rail 7, fastened to casing 1. On the opposite side of the light shaft, the slide 4 is guided by a fork-shaped recess 8, along a pin 9 fastened to casing 1. The slide is under the effect of a spring 10 wound around guide rail 7, the other end of said spring lying against casing 1.

The viewing and focusing objective 11 of the camera is guided in a similar manner. This objective is carried by a slide 12, which glides by means of two eyelets on a guide rail 13 and is under the effect of a spring 14. Guiding of the slide 12 is similar to that of slide 4 and is effected by a fork-shaped recess 15 which glides on a stationary pin 16 fastened to the camera casing. In the space behind the finder objective 11, a reflex mirror 17 is indicated.

A rocking lever 19 is movably arranged in the casing 1 by means of pivot 18. In the ranges of slides 4 and 12, respectively, lever 19 is provided with angle portions 20 and 21. As shown in Fig. 3, an angle part 22 is fastened by means of two screws 23 and 24, to eyelet 6 of slide 4. An adjusting screw 25 arranged in part 22 lies with its point against angle portion 20 of lever 19. To the corresponding eyelet of the slide 12 for the finder objective, analogous parts corresponding to angle portion 22 and screw 25, are fastened and these parts are connected with angle portion 21 of lever 19.

Connected to lever 19 is a pin or plug 26 which lies against cam disc 27, which can be turned by means of an adjusting knob 28. During such adjustment, rocking lever 19 moves about its pivot 18, whereby slides 4 and 12 of the taking and viewing objectives, respectively, are simultaneously displaced. The points of engagement of adjusting screws 25 connected with slides 4 and 12, respectively, are selected on the angle portions or members 20 and 21 of lever 19 in such a manner that the paths of displacement of different lengths of slides 4 and 12, which result from the different lever lengths, correspond to the necessary displacements of the taking and viewing objectives, respectively, which have different focal lengths.

The possibility of the practically necessary adjustment of the device, is provided by adjusting screw 25. In order to provide for an adjustment of the point of engagement of said screw on angle parts 20 and 21 of lever 19, parts 22 fastened to slides 4 and 12, respectively, are adjustably arranged on the latter. As shown in Fig. 4, part 22 is provided with an elongated hole 29, in the range of which it can be swung about the hole for screw 23. The adjusted position is fixed by tightening screws 23 and 24.

It will be understood that this invention is not limited to the elements, arrangements and other details specifically described above and illustrated in the drawings and can be carried out with various modifications without departing from the scope of the invention as defined in the appended claim.

What is claimed is:

A photographic camera comprising a picture-taking chamber, a viewing chamber arranged above said picture-taking chamber, and a picture-taking objective and a finder objective of different focal lengths; the path of displacement for sharp focusing, of the finder objective and the path of displacement for adjusting to the distance of the object, of the picture-taking objective, being different from each other; a first adjustably guided carrier for the picture-taking objective and a second adjustably guided carrier for the finder objective, said picture-taking objective and said finder objective being fastened to said first and second carrier, respectively; a first angle part seated on said first carrier and a second angle part seated on said second carrier, said first and second angle parts being displaceable relative to said first and second carrier, respectively; a first adjusting screw arranged in said first angle part and a second adjusting screw in said second angle part; a rocking lever swingably arranged at one of its ends on a bolt fastened to the camera casing, said first carrier being under the effect of a first spring and said second carrier being under the effect of a second spring, in order to keep the first and second adjusting screw in said first and second carrier, respectively, in permanent contact with the rocking lever, which is arranged on said bolt in such a manner that the adjusting screw arranged on the first carrier is capable of contacting the rocking lever in a predetermined first range spaced from said bolt, while the adjusting screw arranged on the second carrier is capable of contacting the rocking lever in a predetermined second range which is different from said first range and is spaced from said bolt; a rotatable adjusting knob arranged on the camera body, and a cam connected with said rotatable knob, the part located between the points of contact with said adjusting screws, of the rocking lever, lying against said cam which is displaceable by said rotatable knob, in order to cause the rocking lever to swing and to impart to the picture-taking objective and the finder objective adjusting displacements which correspond to the focal lengths of said objectives and are different from each other.

References Cited in the file of this patent

UNITED STATES PATENTS

| | | |
|---|---|---|
| 339,736 | Bragg | Apr. 13, 1886 |
| 738,072 | Schell | Sept. 1, 1903 |
| 1,178,478 | Becker | Apr. 4, 1916 |
| 1,187,136 | Gall | June 13, 1916 |
| 1,469,547 | Torka et al. | Oct. 2, 1923 |
| 1,574,948 | Torka | Mar. 2, 1926 |
| 2,293,438 | Liebmann et al. | Aug. 18, 1942 |
| 2,302,584 | Steiner | Nov. 17, 1942 |
| 2,495,355 | Stahl | Jan. 24, 1950 |